Aug. 31, 1954  R. B. MATTHEWS  2,687,870
ELECTROMAGNETIC CONTROL DEVICE
Filed Sept. 14, 1950  4 Sheets-Sheet 1

INVENTOR.
Russell B. Matthews
BY
Brown, Jackson, Boettcher & Dienner
Attys.

Aug. 31, 1954  R. B. MATTHEWS  2,687,870
ELECTROMAGNETIC CONTROL DEVICE
Filed Sept. 14, 1950  4 Sheets-Sheet 2
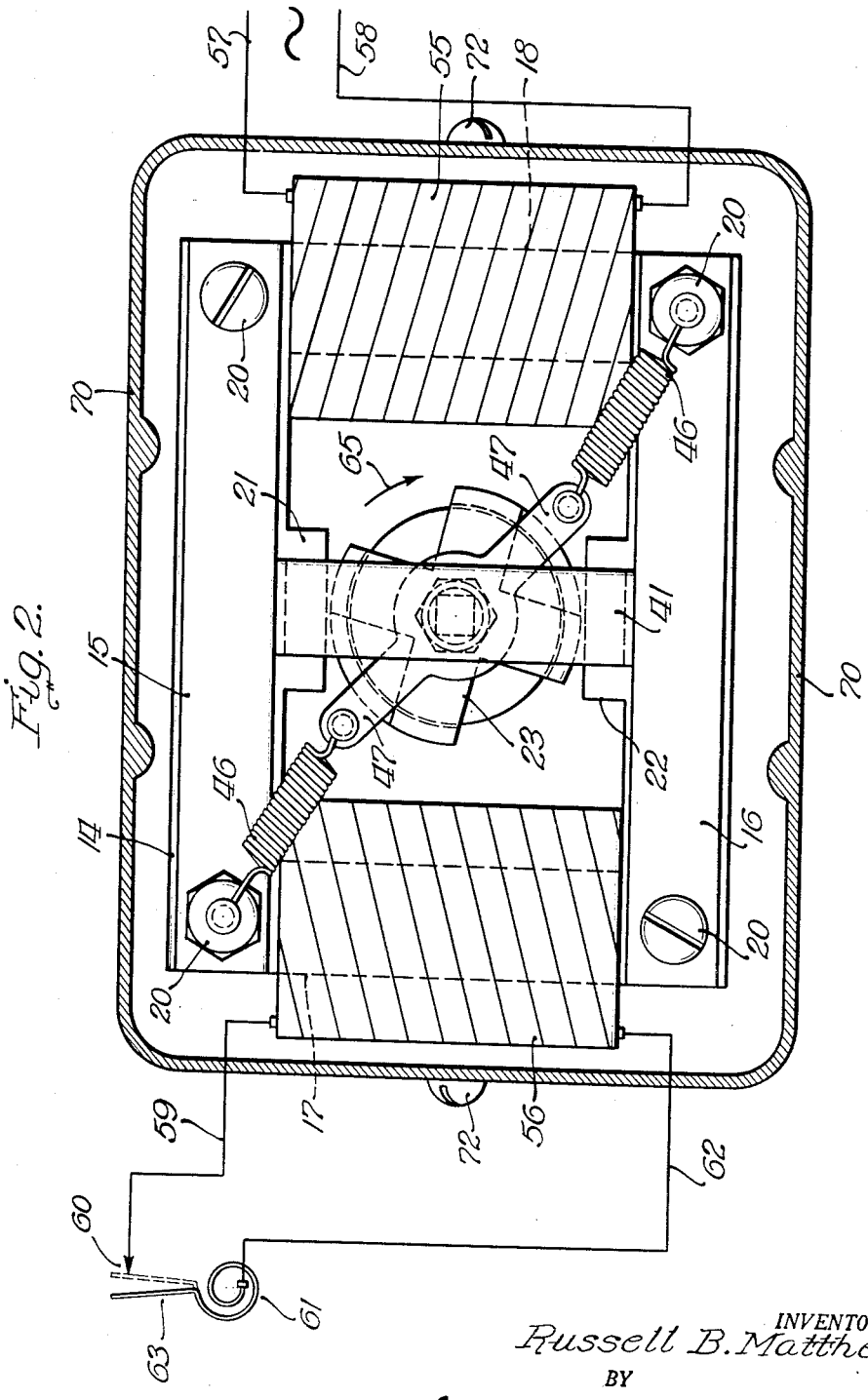
INVENTOR.
Russell B. Matthews
BY
Brown, Jackson, Boettcher, Dienner
Attys.

Aug. 31, 1954  R. B. MATTHEWS  2,687,870
ELECTROMAGNETIC CONTROL DEVICE
Filed Sept. 14, 1950  4 Sheets-Sheet 3
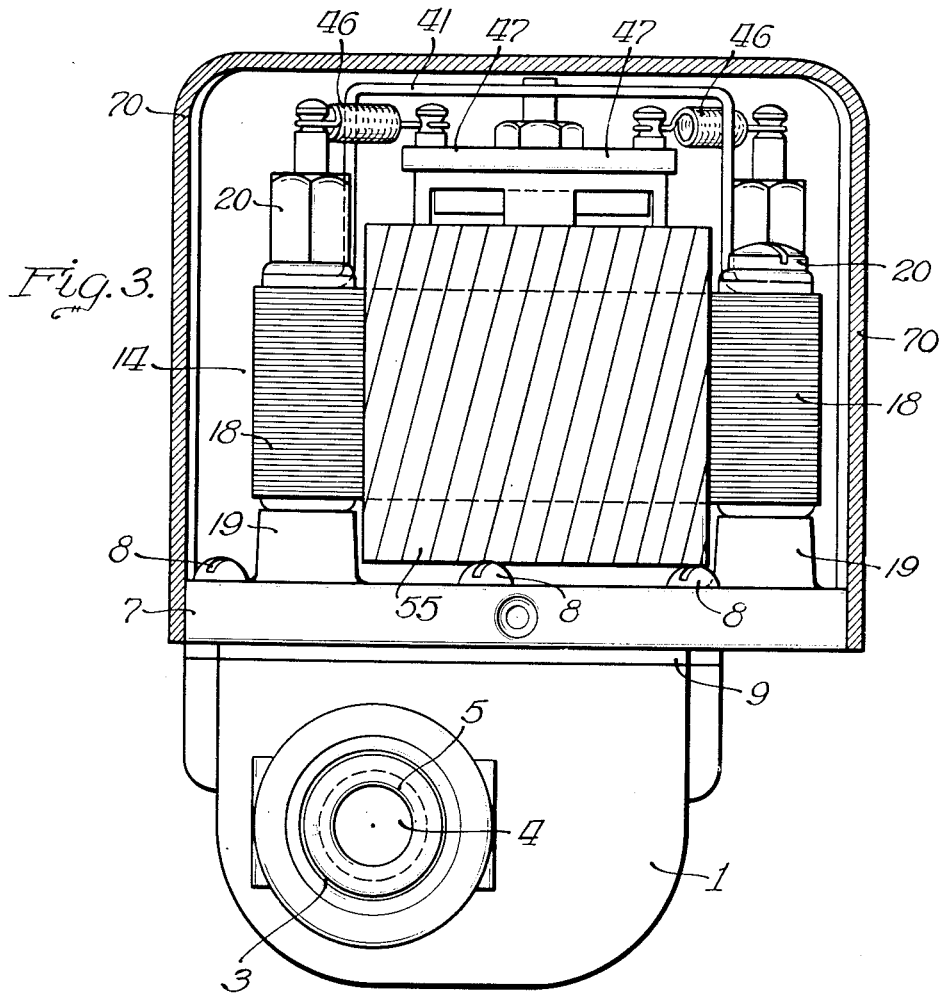
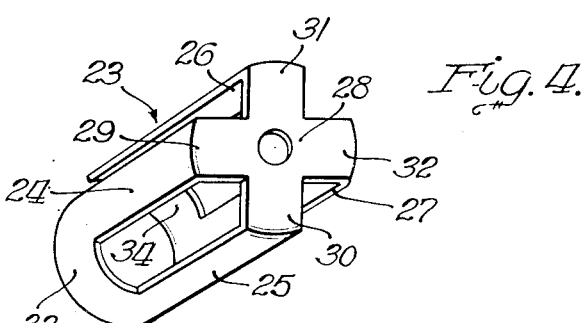
INVENTOR.
Russell B. Matthews
BY
Attys.

Aug. 31, 1954   R. B. MATTHEWS   2,687,870
ELECTROMAGNETIC CONTROL DEVICE
Filed Sept. 14, 1950   4 Sheets-Sheet 4
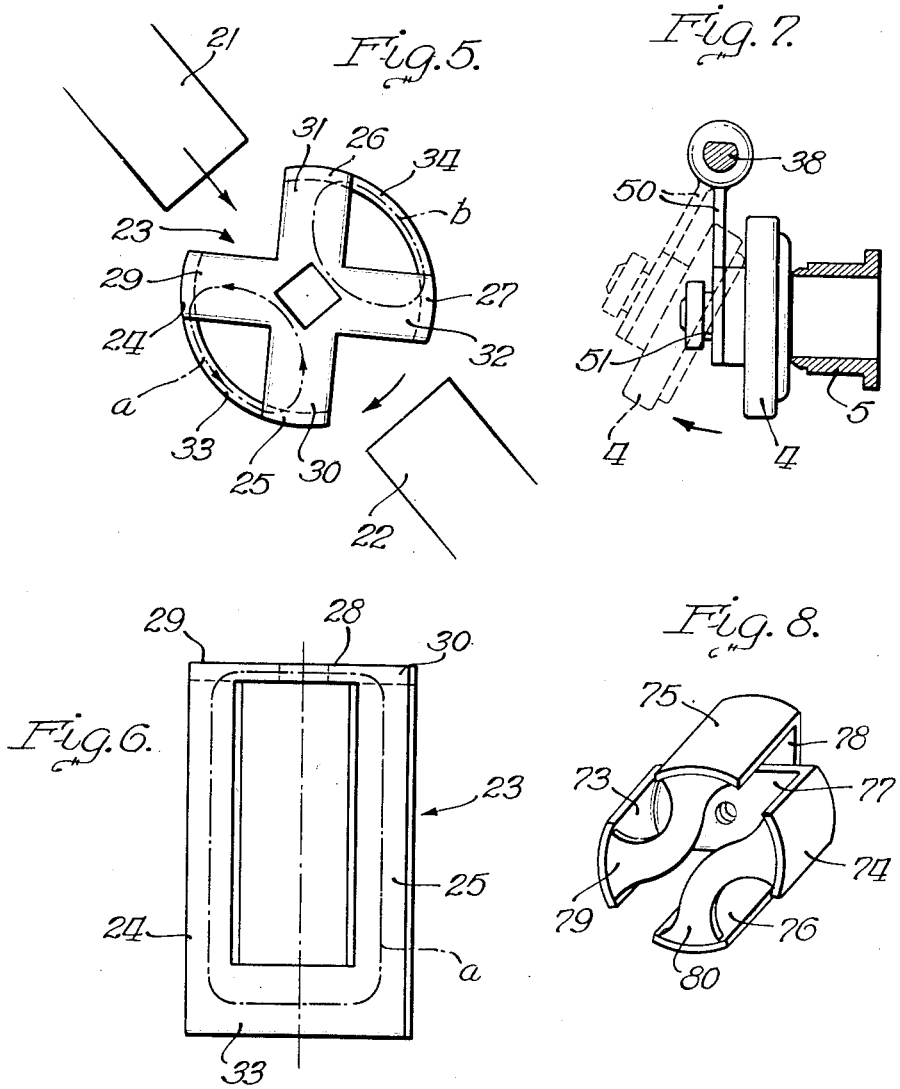
INVENTOR.
Russell B. Matthews
BY
Attys.

Patented Aug. 31, 1954

2,687,870

UNITED STATES PATENT OFFICE 2,687,870

ELECTROMAGNETIC CONTROL DEVICE

Russell B. Matthews, Wauwatosa, Wis., assignor to Milwaukee Gas Specialty Company, Milwaukee, Wis., a corporation of Wisconsin Application September 14, 1950, Serial No. 184,755

17 Claims. (Cl. 251—137)

This invention relates, in general, to control devices, and has particular relation to an improved electromagnetic control device.

While the particular device which I shall describe hereinafter in connection with the drawings is adapted for use for controlling a valve or the like, for in turn controlling a heater or a cooling device or the like, it is to be understood that the present invention may be employed for controlling an electric switch, or for controlling other devices as suitable or desired.

The present invention may be more particularly characterized as relating to devices of the character disclosed and claimed in the copending application to Gifford I. Holmes and Russell B. Matthews, Serial No. 180,482, filed August 19, 1950.

One of the main objects of the present invention is to provide an improved control device wherein the initial operating force which is obtained is a maximum, as distinguished from devices in which the force exerted initially is a minimum. This is advantageous in that it provides a large initial or starting force for overcoming the inertia and friction of moving parts and a strong initial force which, for example, will overcome fluid pressures, for example, for opening a valve wherein the controlled fluid such as gas for a gas heater, usually tends to hold the valve closed.

Another object of the invention is to provide an improved device in which the desired action is obtained by electric induction whereby the effects of residual magnetism are eliminated and the chances of sticking of the device in an unsafe or undesired position are reduced.

Another object of the invention is to provide a device of simple, compact, and relatively inexpensive construction, which will lend itself for controlling a switch, valve, or other controlling device, for example, by a thermostat or other condition responsive device.

Another object of the invention is to provide a device of the class described in which there is a rotor mounted for rotation between pole pieces of the core and to which rotation is imparted to actuate the valve or other device.

Another object of the invention is to provide a device wherein the rotor has a plurality of looped conducting paths through which current induced by the supply of electric energy to a winding on the core is adapted to flow for action upon magnetic flux established in the core to cause rotation of the rotor, and wherein the looped conducting paths are arranged to be moved by rotation of the rotor into equal relation to the pole pieces, whereby the effect of the current induced in one loop bucks the effect of the current induced in another loop and thereby stops the rotation of the rotor.

Another object of the invention is to provide an electromagnetically responsive control device comprising a winding provided with a core having a first core portion through which flux established by energization of the winding is adapted to pass, the core having a second core portion provided with spaced pole pieces, and there being flux diverting means operable to divert flux from the first core portion to the second core portion and a non-magnetic and conducting rotor mounted for rotation between the pole pieces, and in which electric current is induced by the energization of the winding to cause rotation of the rotor.

Another object of the invention is to provide a device in which the core and the windings for establishing and diverting the magnetic flux through the core constitutes a current limiting step-down transformer wherein the electric energy produced in a secondary winding may be relatively low and substantially constant, so that the secondary circuit and a thermostate or other control device therefor will not be deleteriously affected by the energizing current supplied to the primary winding, and so that the type of insulating conduits required for line voltage conductors are unnecessary.

Another object of the invention is to provide a device which is immune to short circuits on the secondary side of the transformer from the standpoint of damage due to overheating.

Another object of the invention is to provide a device which is immune to the influence of gravity and may therefore be used in any desired position.

Further objects and advantages of the invention will appear from the following detailed description taken in connection with the accompanying drawings.

In the drawings:

Figure 2 is a plan view with the cover for the electromagnetic operator in section, and showing more or less diagrammatically, portions of the electric circuit for the device;

Figure 3 is an end view taken from the right of Figure 1 with the cover in section;

Figure 4 is a perspective view of the rotor;

Figure 5 is a plan view of the rotor in relation to the pole pieces, showing diagrammatically, how the current induced in the conductive loops of the rotor acts upon the magnetic flux to cause rotation of the rotor, and in dotted lines the rotor in position with the conductive loops in equal relation to the pole pieces;

Figure 6 is a side elevational view of the rotor showing one of the conductive loops;

Figure 7 is a fragmentary detail view showing the connection between the rotating actuator and the valve member; and Figure 8 is a perspective view showing another form of rotor.

Figure 1:
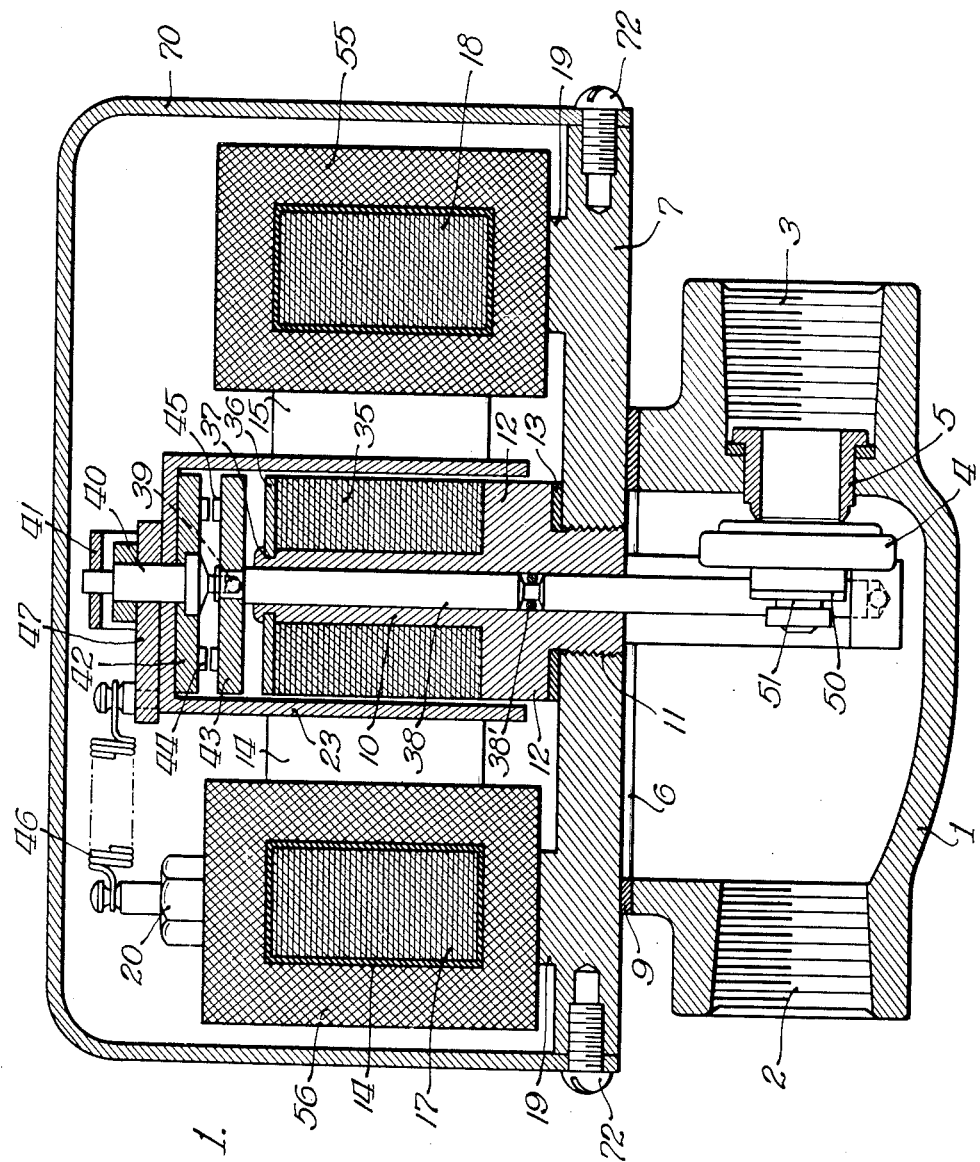
Figure 1 is an axial sectional view of one form of device embodying the present invention.

Referring first to Figures 1–7 of the drawings, the embodiment of the invention therein illustrated comprises a valve body 1 having a fluid inlet 2 and a fluid outlet 3. A valve member 4 cooperates with a valve seat 5 at the outlet 3 to control the flow of fluid through the valve, for example, the flow of gaseous fuel to a burner (not shown), or any other fluid. It will be noted that the controlled fluid tends to hold the valve member 4 closed. This may, of course, vary within the scope of the present invention.

The valve body 1 has an opening 6 covered by a plate 7 which is secured in place over the opening 6, for example, by screws 8 (Figure 3). Sealing means 9 is preferably interposed between plate 7 and valve body 1. The plate 7 is preferably formed of high specific resistance non-magnetic material, such as stainless steel.

A post 10 formed of non-magnetic material such as that previously mentioned, is screwed at 11 into the plate 7. This post 10 has an enlarged head 12 between which and plate 7 there may be a washer or seal 13. The magnetic core 14 is of laminated form as shown, or of other suitable form. The particular core selected for illustration, is of generally rectangular configuration, comprising a pair of parallel side legs 15 and 16, magnetically connected by parallel end legs 17 and 18. The core is arranged in position with its legs surrounding the post 10 and is seated upon and secured to bosses 19 integral with the plate 7, for example, by screws 20. The side legs 15 and 16 of the core 14 have spaced pole pieces 21 and 22 formed, for example, as integral parts of the core laminations. A rotor 23 is mounted for rotation about the post 10 in a position between the pole pieces 21 and 22.

The rotor 23 is formed of non-magnetic and good electric conducting material, such as copper, aluminium or other suitable material, and has two pairs of conductive side legs 24 and 25, and 26 and 27, which are shown arranged in an annular path. A generally cross-shaped integral conductive end member 28 has radial legs 29 and 30 conductively connecting side legs 24 and 25, and radial legs 31, 32 conductively connect the side legs 26 and 27 at one end of the rotor. The legs 24, 25 are conductively connected at the opposite ends of the rotor by an integral arcuate conducting portion 33, and the legs 26, 27 are conductively connected by a corresponding integral arcuate conducting portion 34.

The structure described forms in the rotor a pair of looped conducting paths indicated by dot-and-dash lines *a* and *b* for a purpose which will presently appear. These conducting paths are shown in parallel circuit relation, but they may within the scope of the present invention, be in series circuit relation as will also presently appear.

A stationary magnetic core 35 which is circular and of laminated or other suitable form is fixedly secured on the post 10 and within rotor 23, for example, between the head 12 and a disc 36 fixed at 37 on the upper end of the post as the device is shown in Figure 1.

An actuator rod 38 extends axially through an opening in post 10 and has rotation therein. An annular or "O" shaped ring 38' forms a gas seal between rod 38 and the inner periphery of the opening in the post 10. The upper end of post 10 has a socket in which is mounted a ball bearing 39. A coaxial pin 40 has a lower reduced end supported on bearing 39 and an upper reduced end journaled in a retaining fork 41.

For the purpose of imparting rotation to the rod 38 from the rotor 23 which constitutes the prime mover, cooperating actuating means is provided on the rotor 23 and on the rod 38. The particular actuating coupling selected for illustration comprises a disc 42 fixed to turn with the rotor 23 and a disc 43 fixed to turn with the rod 38. These discs are preferably formed of high specific resistance non-magnetic metal such as stainless steel, and have cooperating clutch claws 44 and 45. The claws 44 and 45 are preferably arranged to permit initial rotation of the rotor 23 free of the actuating rod 38 followed by engagement of claws 44 with claws 45 whereupon the rod 38 is picked up with an impact and turns with the rotro 23.

The rotor 23 is retained in the position shown in Figure 2 and returned to this position when current is not induced in the rotor, for example, by a pair of coiled springs 46. One spring 46 is connected between an arm 47 fixed to turn with the rotor 23 and one of the screws or posts 20. The other spring 46 is connected between a similar and diametrically opposite arm 47 fixed to turn with the rotor 23 and a diametrically opposite screw or post 20.

The valve 4 is fixed on the lower end of the rod 38 to swing to open and closed positions by rotation of rod 38. This may be accomplished as shown in Figure 7 by an arm 50 fixed on the lower end of the rod 38 to turn therewith. The valve 4 is attached, adjustably if desired, to the outer end of the arm 50 at 51.

An alternating current winding 55 is wound around the magnetic core leg 18 and a secondary winding 56 is wound around the magnetic core leg 17. It is to be understood that either winding may be the primary winding and either winding may be the secondary winding. The electric power for energizing the winding 55 is supplied from a suitable source, for example, from line conductors 57 and 58 leading from a suitable source of alternating current, such as a household current supply line of the type which averages about 115 volts.

One end of the secondary winding is connected by a conductor 59 with the fixed contact 60, for example, of a thermostat 61. A conductor 62 connects the other terminal 63 of the thermostat 61 to the other end of the secondary winding 56. The thermostat 61 may be positioned, for example, in a room or other space, or it may be placed where it will be subject to the temperature of a heater or otherwise disposed as desired. It is also contemplated that the device 61 instead of being a temperature responsive thermostat may be any other condition responsive means or other device for opening and closing the circuit of the secondary winding 56 as and when suitable or desired.

In the operation of the device as shown in

Figures 1–3, the primary winding 55 is always energized from the line conductors 57 and 58 or other suitable source of power. With the thermostat 61 in a position separating its contact 63 from contact 60, the circuit for winding 56 is open and this winding is not energized. At this time the magnetic flux established by energization of primary winding 55 passes through the legs 15, 16, 17 and 18 of the core 14 and very little flux passes, for example, in the direction across the pole pieces 21 and 22.

When, however, for example, the temperature to which the thermostat is responsive decreases, the thermostat 61 closes the contact 63 into engagement with contact 60. This closes the circuit of the secondary winding 56 and current is induced in this winding by the energization of the primary winding 55. This current induces magnetic flux which opposes the magnetic flux established in magnetic leg 17 by the primary winding 55. As a result, the flux established by the winding 55 is diverted, for example, in a direction across the pole pieces 21 and 22.

Since the rotor 23 presents in effect, a pair of closed conductor loops 24, 33, 25, 30 and 29, and 26, 34, 27, 32 and 31 of good conductivity, there is induced in these loops alternating current of opposite polarity to that impressed upon the winding 55. This current flows through the looped paths shown by the dot-and-dash lines a and b in Figures 5 and 6. This current induces an alternating flux, the polarity of which opposes the polarity of the flux established across the pole pieces 21 and 22 by the winding 55 when the circuit for the winding 56 is closed. As a result, the rotor 23 is rotated, for example, in the direction shown by the arrow 65 in Figure 2. The initial operating force is imparted to the rotor 23 by repulsion and hence this initial force is a maximum.

The initial rotation of the rotor on the bearing 39 is preferably free of the actuator rod 38, but this initial free turning of the rotor is followed by engagement of clutch claws 44 with clutch claws 45. As a result, the actuator rod 38 is picked up with relatively heavy impact and the actuator rod 38 then turns with the rotor 23. This turning movement of the rod 38 is imparted to the actuated device, which in the case of a valve as shown in the drawings, is preferably opened by such turning movement to take advantage of the powerful initial operating force. As a result of this powerful force, the valve 4 may be relatively large and heavy, yet operated to open position with a small compact operator.

As the rotor 23 rotates through about 90° the looped conducting paths 24, 33, 25, 30 and 29, and 26, 34, 27, 32 and 31 turn to equal relation to the pole pieces 21 and 22. The effect of the current induced in one looped path then bucks or opposes the effect of the current induced in the other looped path, and thereby stops the rotation of the rotor. Thus the rotor 23 limits the amount of its own rotation without additional stop means. The rotor 23 remains in this position and, for example, with valve 4 open as long as the primary winding 55 is energized and the circuit of the secondary winding 56 is closed.

When thermostat 61 disengages contact 63 from contact 61 the magnetic flux established by energization of winding 55 is again short circuited through core legs 15, 16, 17 and 18, and very little flux will exist in a direction across the pole pieces 21 and 22. Hence, the springs 46 will cause the rotor 23 to rotate in the opposite direction with an attendant movement of the actuated device 4 in the opposite direction, for example, in the case of a valve as shown in the drawings, to a closed position.

Another important advantage of the invention results from the fact that the core 14, and the windings 55 and 56 for establishing and diverting the magnetic flux in a direction across the pole pieces 21 and 22, constitute a current limiting step-down transformer, wherein the electric energy produced in the secondary winding may be relatively low and substantially constant so that the secondary circuit and thermostat or other control device therefor will not be deleteriously affected by the energizing current supplied to the primary winding, and so that the type of insulating conduits required for line voltage conductors are unnecessary. The device is also immune to short circuits on the secondary side of the transformer from the standpoint of damage due to overheating, and it is immune to the influence of gravity and, therefore, may be used in any desired position.

While I have shown and described a flux diverting secondary winding and associated core leg, it is to be understood that the secondary winding and the related core portion may be omitted within the scope of the present invention. In such case the thermostat or other means may be placed directly in the circuit for the primary winding 55. This will provide a line voltage device which is rendered operable by energization of the primary winding when the primary circuit is closed and rendered inoperable by opening the circuit for the primary winding.

The operator is enclosed within a housing 70 which may be removably secured in place to the plate 7, for example, by screws 72.

In the form of rotor shown in Figure 8, the conducting loops, in which the current is induced and which are formed by two pairs of conducting legs 73 and 74, and 75, 76, are connected in series circuit relation. A conducting end member 77 conductively connects legs 73, 74 at one end, and conducting end member 78 conductively connects the conducting legs 75 and 76. A conducting connecting piece 79 connects, for example, legs 73 and 75 at the opposite end and a conducting piece 80 connects the legs 74 and 76.

The embodiments of the invention shown in the drawings are for illustrative purposes only, and it is to be expressely understood that said drawings and the accompanying specification are not to be construed as a definition of the limits or scope of the invention, reference being had to the appended claims for that purpose.

I claim:

1. In a device of the class described, in combination, a magnetic core having a single pair of spaced pole pieces comprising a first pole piece and a second pole piece, a winding on said core adapted to produce magnetic flux in said core and to cause same to traverse the space between said pole pieces, an armature mounted to turn about an axis in the space between said pole pieces, said armature having first and second current conducting paths each of closed circuit looped form through which current induced by the supply of electric energy to said winding is adapted to flow, one of said first and second looped conducting paths being disposed completely on one side of the axis of said armature and the other of said first and second conducting paths being disposed completely on the other side of the axis of said armature, and means for positioning said armature in a first position where said first looped conducting path will be acted upon by the magnetic flux traversing the space between said pole pieces to impart turning movement to said armature, said second looped conducting path of the armature being turned by said turning movement to a position where the effect of the magnetic flux traversing the space between said pole pieces will, by action on said second looped conducting path, buck and balance the action on the first conducting path to stop turning movement of the armature at a position less than a complete rotation from its first position.

2. A device according to claim 1 wherein said looped conducting paths are biased to unbalanced relation with respect to the flux path between said pole pieces when said winding is deenergized and move by energization of said winding to balanced relation with respect to said flux path to stop turning movement of said armature by balanced reaction of the magnetic flux on said looped conducting paths.

3. An electromagnetic operator comprising, in combination, a magnetic core having a pair of spaced pole pieces with an air gap therebetween, means for producing a magnetic flux in said core and across said air gap, an armature mounted to turn about an axis in said air gap, said armature having first and second current conducting paths each of closed circuit looped form through which current induced by the supply of electric energy to said winding is adapted to flow, one of said first and second looped conducting paths being disposed completely on one side of the axis of said armature and the other of said first and second conducting paths being disposed completely on the opposite side of the axis of said armature, and means biasing said armature to position so that the current induced in only one of said looped conducting paths will react with the flux across said air gap to impart turning movement to said armature from its biased position, the other looped conducting path being moved by said turning movement of said armature to position so that the current induced therein reacts with the flux across the air gap in opposition to said aforementioned reaction to stop turning movement of said armature at a position less than a complete rotation from its biased position.

4. A device according to claim 3 wherein the first and second looped conducting paths of said armature are connected in parallel circuit relation.

5. A device according to claim 3 wherein the first and second looped conducting paths of said armature are connected in series circuit relation.

6. A device according to claim 3 wherein there is an actuator mounted for turning movement, and cooperating actuating means on said armature and on said actuator for imparting turning movement to said actuator by turning movement of said armature.

7. A device according to claim 3 wherein there is an actuator mounted for turning movement, and cooperating actuating means on said armature and on said actuator for imparting turning movement to said actuator by turning movement of said armature, said cooperating actuating means being of a character to provide initial turning of the armature free of said actuator followed by driving connection between said armature and said actuator.

8. A device according to claim 3 wherein there is an actuator mounted for turning movement, and clutch means for imparting turning movement from said armature to said actuator and of a character to provide initial turning of the armature free of said actuator.

9. A device according to claim 3 wherein there is a control member having at least two different positions and actuated from one position to the other position by turning movement of said armature.

10. A device according to claim 3 wherein there is a valve member having open and closed positions and actuated to open position by turning movement of said armature.

11. A device according to claim 3 wherein the looped conducting paths of said armature are formed by a plurality of pairs of conducting side legs arranged in an annular path with end legs conductively connecting each pair of said side legs at one end of said armature and arcuate conducting portions conductively connecting each pair of side legs at the other end of said armature.

12. A device according to claim 3 wherein there is a magnetic core within the armature with air gaps between the pole pieces and said last mentioned magnetic core in which the armature is free to turn.

13. A device according to claim 3 wherein the looped conducting paths of said armature are formed by a plurality of pairs of conducting side legs arranged in an annular path with end legs conductively connecting each pair of side legs at one end of said armature, arcuate conducting portions conductively connecting each pair of side legs at the other end of said armature, and a stationary magnetic core of circular form within said armature.

14. An electromagnetic operator according to claim 3 wherein each looped conducting path comprises a pair of non-magnetic and electric conducting legs arranged in an annular path and extending generally parallel with the axis of the armature, said legs being of arcuate form in transverse section, transversely disposed non-magnetic and electric conducting means conductively connecting the two legs of each pair of legs at one end of the armature, and arcuate non-magnetic and electric conducting means conductively connecting the two legs of each pair of legs at the opposite end of said armature.

15. A device according to claim 3 wherein the core including the spaced pole pieces constitutes a first core portion and wherein there is a second core portion and flux diverting means operable to divert flux from said second core portion and to cause same to traverse the space between the pole pieces.

16. A device according to claim 3 wherein the core including the spaced pole pieces constitutes a first core portion and wherein there is a second core portion and flux diverting means operable to divert flux from said second core portion and to cause same to traverse the space between the pole pieces, said flux diverting means comprising a second winding on the second core portion, a circuit for said second winding, and condition responsive means controlling said circuit.

17. A device according to claim 3 wherein the core including the spaced pole pieces constitutes a first core portion and wherein there is a second core portion and flux diverting means operable to divert flux from said second core portion and to cause same to traverse the space between the pole pieces, said flux diverting means comprising a second winding on the second core portion, a circuit for said second winding, and condition responsive means controlling said circuit, said first and second windings and said core constituting a current limiting step-down transformer wherein the electric energy established in said second winding is relatively low and substantially constant.

References Cited in the file of this patent

UNITED STATES PATENTS

| Number | Name | Date |
|---|---|---|
| 363,186 | Thomson | May 17, 1887 |
| 868,230 | Thullen | Oct. 15, 1907 |
| 1,672,193 | Bason | June 5, 1928 |
| 1,979,127 | Warrick | Oct. 30, 1934 |
| 2,380,165 | Goldsborough | July 10, 1945 |
| 2,405,370 | Ray | Aug. 6, 1946 |
| 2,458,123 | Wasserlein | Jan. 4, 1949 |